United States Patent [19]
Lamarca

[11] Patent Number: 5,918,999
[45] Date of Patent: Jul. 6, 1999

[54] GEOMETRIC SPACIAL FRAME ASSEMBLY

[76] Inventor: Guy M. Lamarca, 2315 Clinton St., Homestead, Pa. 15120

[21] Appl. No.: 09/049,479

[22] Filed: Mar. 27, 1998

[51] Int. Cl.$^6$ ......................................................... F16B 7/04
[52] U.S. Cl. .......................... 403/397; 403/384; 446/111; 446/115
[58] Field of Search ..................................... 446/111, 112, 446/114, 115, 116, 120, 126, 128; 403/171, 170, 176, 217, 397, 389, 386, 384; 52/656.1, 655.1

[56] References Cited

U.S. PATENT DOCUMENTS

| | | |
|---|---|---|
| 129,713 | 7/1872 | Cadwell et al. . |
| D. 174,951 | 6/1955 | Frishberg ................................. 446/111 |
| 1,898,297 | 2/1933 | Fox . |
| 3,046,852 | 7/1962 | Graham . |
| 3,197,822 | 8/1965 | Herrschaft . |
| 3,282,006 | 11/1966 | Halsey et al. ............................ 403/384 |
| 3,479,763 | 11/1969 | Fischer . |
| 3,513,588 | 5/1970 | Fischer . |
| 3,513,590 | 5/1970 | Fischer . |
| 3,513,606 | 5/1970 | Jones ............................................ 52/27 |
| 5,580,181 | 12/1996 | Nomura .................................. 403/170 |
| 5,609,435 | 3/1997 | Nomura .................................. 403/387 |
| 5,620,273 | 4/1997 | Heyn et al. ............................. 403/176 |

FOREIGN PATENT DOCUMENTS

| | | |
|---|---|---|
| 2651471 | 5/1978 | Germany . |
| 1246795 | 9/1971 | United Kingdom .................. 403/170 |

Primary Examiner—Anthony Knight
Assistant Examiner—Alison K. Pickard
Attorney, Agent, or Firm—Carothers & Carothers

[57] ABSTRACT

A three dimensional geometric structural framework made up of subassemblies of cross members connected by end connectors. The subassemblies are then interconnected with clip members. The cross members have a cross section providing protruding triangular arrowhead corners and the clip members are shaped for engaging and retaining the arrowhead corners of juxtaposed cross members together in fixed relationship.

10 Claims, 4 Drawing Sheets

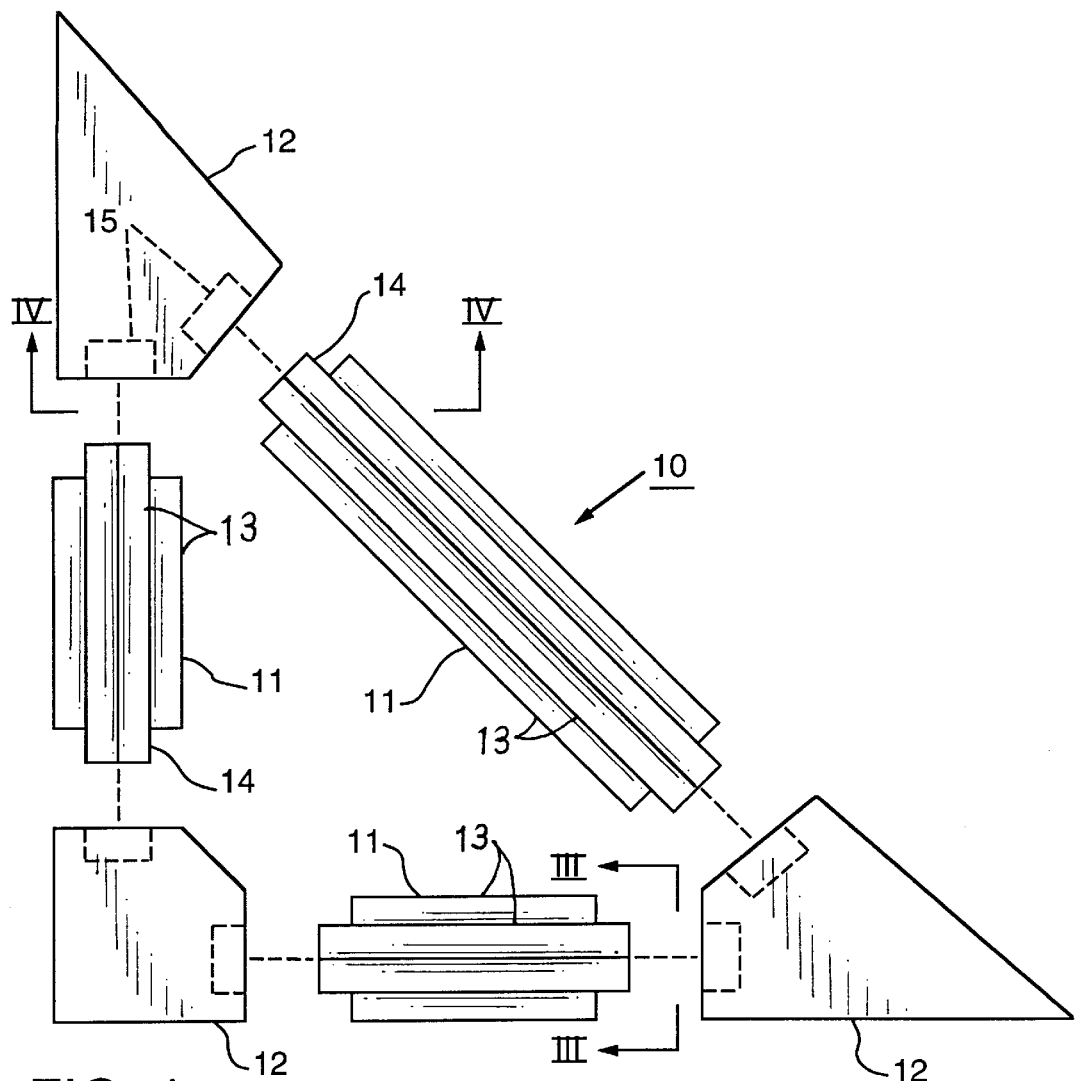
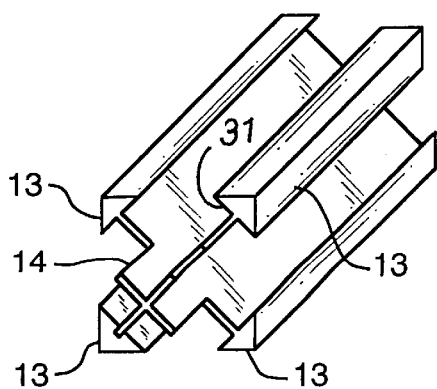
FIG. 2
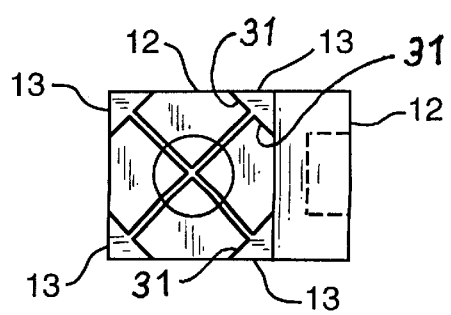
FIG. 3

GEOMETRIC SPACIAL FRAME ASSEMBLY

BACKGROUND OF THE INVENTION

This invention relates to new and useful improvements in the art of structural assemblies, and in particular three dimensional or spacial assemblies constructed of certain standardized components which are capable of being assembled into an integrated structural unit.

A principal object of the present invention is to facilitate the construction of such assemblies in a simple and convenient manner without the requirement of special tools or knowledge, and for assembling such structures with characteristics of infinite structural variation, sturdiness and pleasing appearance of the completed assembly.

SUMMARY OF THE INVENTION

The geometric structural framework of the present invention is constructed of elongated cross members connected by end connectors. The cross members have a cross section that provides protruding arrowhead corners. Clips are provided which are shaped and dimensioned for engaging and retaining these arrowhead corners of juxtaposed cross members together in fixed relationship.

Each of these elongated cross members is usually provided with four protruding or outside arrowhead corners. These cross members are of uniform cross section and are therefore easily constructed of plastic or metal by an extrusion process.

The cross members may be triangular for three cornered stock, square in cross section or rectangular from corner to corner for four cornered stock, or polygonal in cross section for more than four outside corners.

The clips externally span around two parallel elongated arrowhead corners of adjacent juxtaposed cross members. The clips are also provided in uniform cross section and may additionally be readily cut from extruded stock. These clips may be flexible yet substantially rigid whereby they can snap fit over adjacent arrowhead corners of the cross members or they may be rigid and fit in sliding engagement over adjacent arrowhead corners.

The clips which interconnect the cross members may be provided in other suitable forms. In one alternative form the clip is provided in the form of a rod or tubular structure with external longitudinally extending grooves that are spaced and dimensioned for engaging and retaining therein internal juxtaposed arrowhead corner edges of adjacent cross members in fixed relationship.

The elongated arrowhead corners of the elongated cross members may be provided in substantially rigid yet flexible form such that adjacent cross member arrowhead corners snap fit over the internal clip member into the grooves of the rod or tubular clip just described. Alternatively the cross members may be fully rigid and the internal clip slid into position from the end of adjacent cross members.

Two dimensional and three dimensional structures can thus be easily constructed of these cross members and corner connectors to form geometric subassemblies, which subassemblies are interconnected with the clips.

BRIEF DESCRIPTION OF THE DRAWINGS

Other objects and advantages appear in the following description and claims. The accompanying drawings show, for the purpose of exemplification, without limiting the invention or appended claims, certain practical embodiments of the present invention wherein:

FIG. 1 is an exploded plan view of one embodiment of a subassembly of the geometric structural framework of the present invention;

FIG. 2 is an isometric view of one of the cross members of the geometric structural framework of FIG. 1;

FIG. 3 is an end view of one of the cross members as inserted into an end connector as seen along section line III—III of FIG. 1;

DETAILED DESCRIPTION OF A PREFERRED EMBODIMENT

Figure 4:
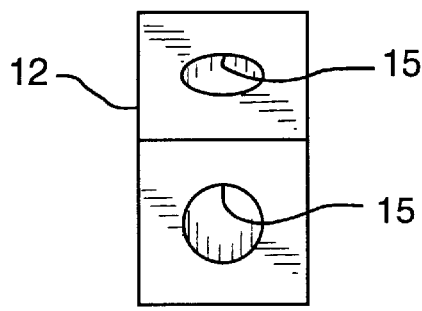
FIG. 4 is an end view of one of the corner connectors shown in FIG. 1 as seen along section line IV–IV.

Referring to FIGS. 1 through 4, the subassembly 10 of geometric structural framework of the present invention includes elongated cross members 11 connected by end connectors 12. The cross members 11 have four protruding arrowhead corners 13.

The elongated cross members 11 are extruded of suitable plastic and cut to length. They are cut at opposite ends to provide X shaped protrusions 14 for insertion and retention of the respective ends of the cross member ends into corresponding counter bores 15 of end connectors 12. These end connections may be glued as desired. The end connectors 12 may be molded or extruded suitable plastic.

This subassembly 10 of cross members 11 and end connectors 12 is illustrated to provide a triangular shaped structure. However, this is only for illustration purposes. Obviously by using the appropriate end connectors 12, one may make any polygonal shaped subassembly as desired.

Additionally, the cross section of the cross members 11 is illustrated as being square. The cross section can also be made such that it is rectangular from corner to corner.

Also, instead of square or rectangular, the cross section of the cross members 11 may take on any polygonal shape, such as triangular or greater than four sides such that there is either three arrowhead corners 13, four as illustrated in the figures, or there could even be five or more protruding arrowhead corners 13 as desired.

Figure 11:
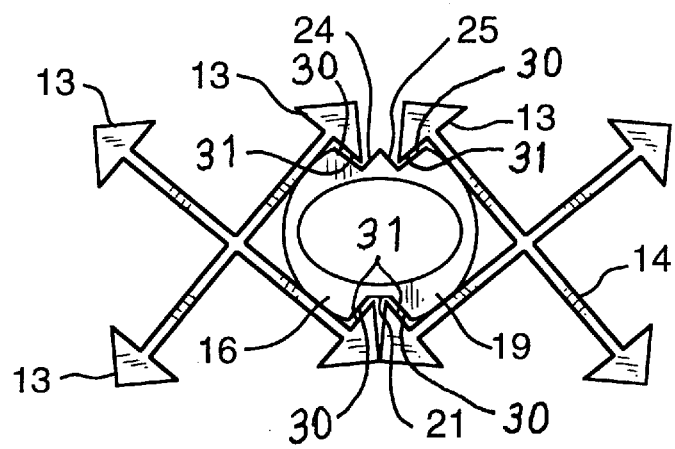
FIG. 11 is an end view of two juxtaposed cross members of the type utilized in the structural frame work subassembly of FIG. 1 illustrating a variation of the internal tubular clip member shown in FIGS. 9 and 10.
Figure 12:
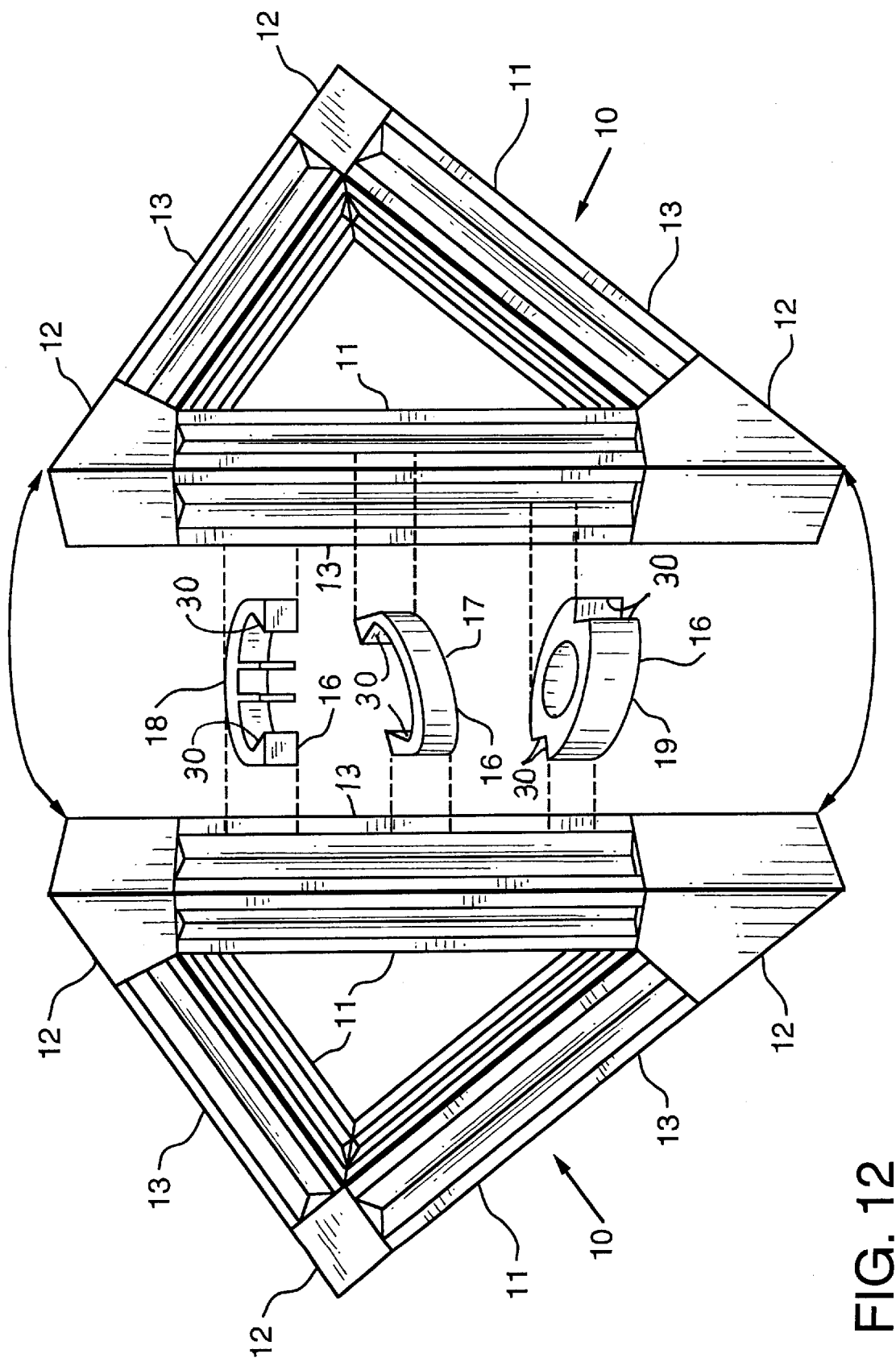
FIG. 12 is a perspective expanded view showing two of the geometrical structural framework subassemblies of FIG. 1 and illustrating alternative clips for connecting the tube members together in order to create a three dimensional geometrical structural framework from the two subassemblies.

Multiple subassemblies 10 as illustrated in FIG. 12 can then be interconnected with clips in accordance with the teachings of the present invention to provide three dimensional geometric structures of any desired shape or configuration. Two of the subassemblies 10 may be clipped together to begin construction of a geometric spacial framework or assembly by interconnecting adjacent juxtaposed cross members 11 with one or more clips 16 of various types or configurations as illustrated in FIG. 12. These particular different types of clips 16 will be discussed hereinafter in detail with reference to the remaining FIGS. 5 through 11.

These clips 16 illustrated in FIG. 12 are of three different varieties respectively indicated as clips 17, 18, and 19.

Figure 5:
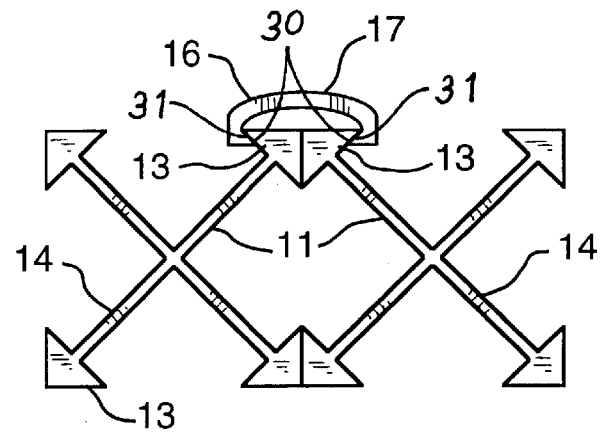
FIG. 5 is an end view illustrating two juxtaposed cross members of the type utilized in the geometric-structural framework of FIG. 1 with a clip engaging and retaining the adjacent arrowhead corners of the cross members together in fixed relationship.
Figure 6:
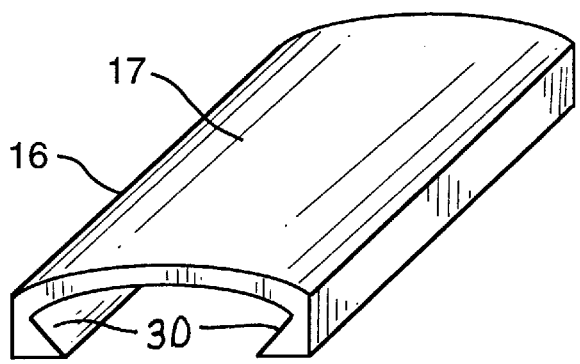
FIG. 6 is an isometric view of the clip member shown in the combination of FIG. 5.

Referring to FIGS. 5 and 6, two juxtaposed cross members 11 are clipped together in fixed relationship by clip 17 which clips over, engages and retains arrowhead corners 13 of juxtaposed cross members 11 together with opposing inclined plane surfaces 30 of the clips engaging inclined plane shoulder surfaces 31 provided under the arrowhead corners as illustrated. All of the clip members 16 illustrated are uniform in cross sections and may therefore also be readily manufactured of extruded product, such as extruded plastic, which provides rigidity yet sufficient flexibility such that it will snap over the adjacent elongated arrowhead corners 13 of adjacent or juxtaposed elongated cross members 11.

As shown in FIG. 5, the clip member 17 externally spans around two parallel arrowhead corners of the adjacent juxtaposed cross members 11.

Figure 7:
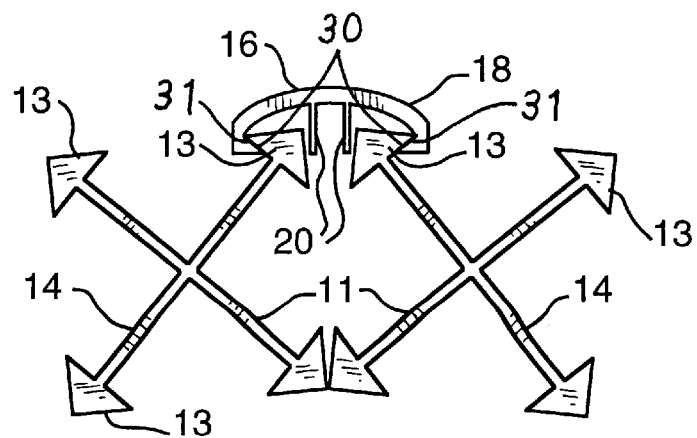
FIG. 7 is an end view of two of the cross members as utilized in the geometric structural frame work of FIG. 1 aligned in juxtaposed position with adjacent parallel arrowhead elongated corners secured together in spaced relationship with an alternate embodiment of the clip illustrated in FIGS. 5 and 6.
Figure 8:
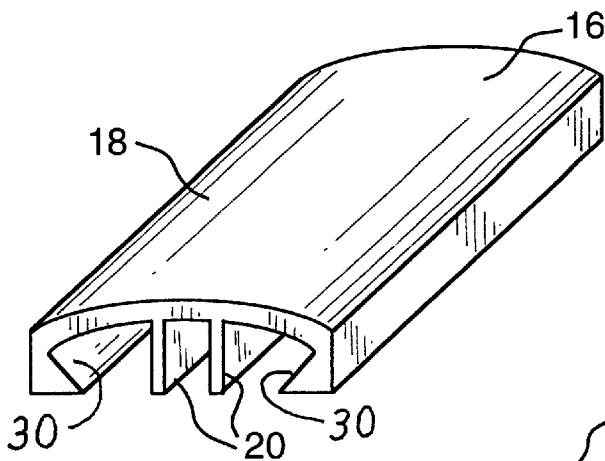
FIG. 8 is an isometric view of the clip shown in FIG. 7 for connecting the geometric structural framework cross members together.

A variation of this clip member 17 is illustrated in FIGS. 7 and 8 wherein the clip member 18 is a little wider in cross section and is provided with two flexible parallel internal flanges 20 so that the adjacent juxtaposed cross members 11 may be held apart in spaced relationship as illustrated in FIG. 7, when desired, for particular three dimensional constructions.

Figure 9:
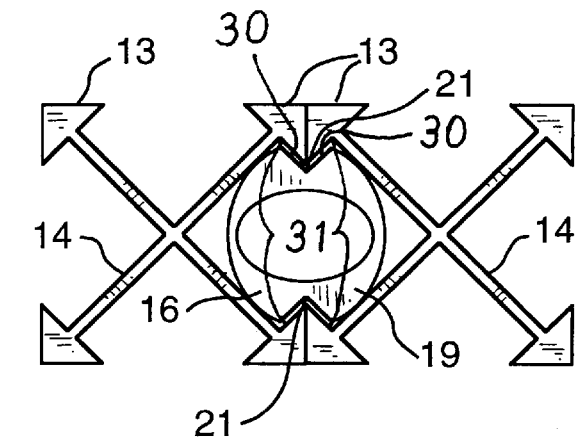
FIG. 9 is an end view of two juxtaposed elongated cross members of the type utilized in the framework of FIG. 1 having adjacent arrowhead corners thereof connected together with an alternate internal tubular clip member.
Figure 10:
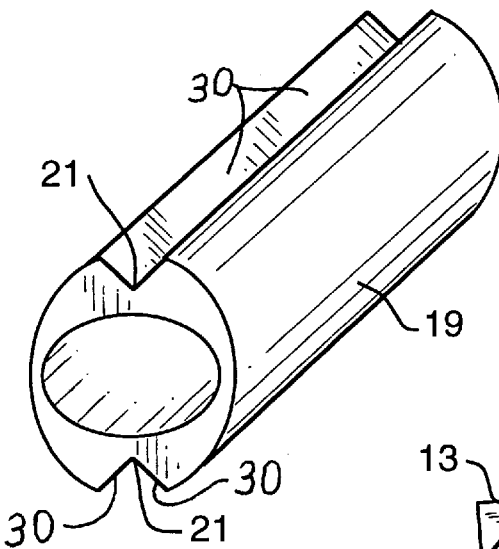
FIG. 10 is an isometric view of the clip member illustrated in FIG. 9.

FIGS. 9 and 10 illustrate yet another clip member 16 in the form of internal rod or tubular clip member 19.

This connector 19 is an internal connector that connects internal corner edges of the arrowhead corners 13 together as illustrated in FIG. 9.

The clip members 19 are provided with opposed longitudinally extending grooves 21 for retaining internal juxtaposed arrowhead corner edges of adjacent cross members 11 together in fixed relationship as illustrated. Cross members 11 are extruded of flexible plastic or metal such that they are rigid yet sufficiently flexible whereby adjacent cross member arrowhead corners snap fit easily over internal clip member 19 to snap into grooves 21.

A variation of this internal clip member 19 is illustrated in FIG. 11 wherein multiple or two or more grooves 24 and 25 are provided adjacent each other along one edge of the clip so that adjacent juxtaposed cross members 11 may be internally clipped together at an angle as illustrated in the figure.

Obviously, the internal clip members 19 and external clip member 11 may take on many different cross sectional configurations to provide interconnection between cross members 11 at many different angles thereby providing an extremely versatile means of constructing structural assemblies from standardized components.

I claim:

1. A geometric structural framework comprised of elongated cross members having a cross section providing protruding arrowhead corners of substantially triangular cross section providing inclined plane shoulder surfaces thereunder, and at least one clip member shaped and dimensioned for engaging and retaining arrowhead corners of juxtaposed cross members together in fixed side by side relationship with opposed inclined plane surfaces of the clips engaging the inclined plane shoulder surfaces of respective arrowhead corners of the juxtaposed cross members.

2. The geometric structural framework of claim 1, wherein each cross member has four of said protruding arrowhead corners.

3. The geometric structural framework of claim 2, wherein said protruding arrowhead corners are substantially continuous in extension with said elongated cross members.

4. The geometric structural framework of claim 3, wherein said elongated cross members have an overall cross section which is square in shape from corner to corner.

5. The geometric structural framework of claim 1, wherein said at least one clip member externally spans around two parallel protruding arrowhead corners of juxtaposed cross members.

6. The geometric structural framework of claim 5, wherein said at least one clip member is flexible whereby it snap fits over adjacent parallel protruding arrowhead corners.

7. The geometric structural framework of claim 1, wherein said at least one clip member is a rod with external longitudinally extending spaced grooves each providing said opposed inclined plane surfaces for respectively engaging and retaining therein said inclined plane shoulder surfaces of juxtaposed protruding arrowhead corners of respective juxtaposed cross members in fixed relationship.

8. The geometric structural framework of claim 7, wherein said clip member is tubular.

9. The geometric structural framework of claim 7, wherein said protruding arrowhead corners have supports which flex such that protruding arrowhead corners of juxtaposed cross members snap fit over said clip member and into said grooves.

10. A geometric structural framework formed of a plurality of geometric subassemblies, said geometric subassemblies comprised of elongated cross members connected at their respective ends by end connectors, said elongated cross members having a cross section providing protruding arrowhead corners of substantially triangular cross section providing inclined plane shoulder surfaces thereunder, and selected juxtaposed elongated cross members of adjacent subassemblies interconnected by clip members shaped and dimensioned for engaging and retaining arrowhead corners of juxtaposed cross members together in fixed side by side relationship with opposed inclined plane surfaces of the clips engaging the inclined plane shoulder surfaces of respective arrowhead corners of the juxtaposed cross members for thereby providing a geometric structural framework of a plurality of said geometric subassemblies.

* * * * *